United States Patent [19]

Backlund

[11] Patent Number: 5,864,118
[45] Date of Patent: Jan. 26, 1999

[54] SOLDERING INSTRUMENT WITH HEATED TIP AND PROTECTIVE HEAT SHIELD ASSOCIATED THEREWITH

[75] Inventor: David D. Backlund, Hanover, Minn.

[73] Assignee: Seagate Technology, Inc., Scotts Valley, Calif.

[21] Appl. No.: 926,578

[22] Filed: Sep. 4, 1997

Related U.S. Application Data

[60] Provisional application No. 60/046,854 Apr. 30, 1997.
[51] Int. Cl.⁶ ...................................................... B23K 3/00
[52] U.S. Cl. ........................... 219/233; 219/221; 228/51; 228/59
[58] Field of Search ................................... 219/221, 243, 219/227–230, 240–241, 535, 544, 476–480, 483, 484, 486, 237, 233; 156/579, 499; 228/51, 59, 180.1

[56] References Cited

U.S. PATENT DOCUMENTS

| 359,506 | 3/1887 | Goodwillie | 219/228 |
|---|---|---|---|
| 1,520,597 | 12/1924 | Reavis | 219/229 |
| 1,744,720 | 1/1930 | Blackburn | 219/229 |
| 1,792,121 | 2/1931 | Pieper | 219/227 |
| 3,555,950 | 1/1971 | Gijsbers et al. | 219/230 |
| 3,786,228 | 1/1974 | Castellana et al. | |
| 3,786,229 | 1/1974 | Hombrecher | |
| 3,969,606 | 7/1976 | Veach | 219/229 |
| 4,045,651 | 8/1977 | Koo | 219/227 |
| 4,431,903 | 2/1984 | Riccio | |
| 4,795,076 | 1/1989 | Gottschild | |
| 4,910,383 | 3/1990 | Zimmer | 219/233 |
| 4,945,210 | 7/1990 | Yoshimura | |
| 4,974,768 | 12/1990 | Ebata | |
| 5,122,637 | 6/1992 | Bottorff et al. | |
| 5,128,506 | 7/1992 | Dahne et al. | 228/180.1 |
| 5,220,147 | 6/1993 | Spigarelli et al. | 228/51 |
| 5,229,575 | 7/1993 | Waller et al. | 219/233 |
| 5,446,262 | 8/1995 | McCambridge | |
| 5,524,809 | 6/1996 | Kosslow et al. | |

FOREIGN PATENT DOCUMENTS

| 885077 | 11/1971 | Canada | 219/229 |
|---|---|---|---|
| 712209 | 1/1980 | U.S.S.R. | 228/59 |
| 767525 | 2/1957 | United Kingdom | 219/227 |

*Primary Examiner*—John A. Jeffery
*Attorney, Agent, or Firm*—Westman, Champlin & Kelly, P.A.

[57] ABSTRACT

A soldering device for soldering lead wires from a disc head to a circuit of the disc drive includes a heat shield adapted to provide a protective barrier for a soldering tip during operation of a soldering instrument. During operation, the soldering tip is heated by a heating element for use. A heat shield is coupled with the soldering tip and designed to provide a temperature barrier along the length of the soldering tip and prevent damage to other wires in close proximity.

19 Claims, 4 Drawing Sheets

SOLDERING INSTRUMENT WITH HEATED TIP AND PROTECTIVE HEAT SHIELD ASSOCIATED THEREWITH

CROSS-REFERENCE TO RELATED APPLICATION

The present invention claims priority to Provisional Application Ser. No. 60/046,854, filed Apr. 30, 1997, and entitled REFLOW TIP HEAT SHIELD.

FIELD OF THE INVENTION

The present invention relates to electrical connection of disc heads in a disc drive assembly. In particular, the present invention relates to an improved soldering instrument for connecting lead wires from a transducer head to circuitry of a disc drive.

BACKGROUND OF THE INVENTION

Disc drives are known to store digital information on rigid discs coated with a magnetizable material and a plurality of circular, concentric data tracks. Discs are mounted on a spindle motor which rotates the discs for operation. Disc heads are positioned relative to the data tracks to read and write data to the disc surface via an actuating mechanism. Electronic circuitry is coupled to the spindle motor and actuation mechanism for positioning the disc heads for reading information from and writing information to selected data tracks.

Disc heads include transducers for reading and writing data to the disc surface. Transducers may be an inductive-type transducer or magnetoresistive (MR) transducer. Thus, depending upon the transducer elements, various lead wires are necessary to electrically connect the transducers to electric circuitry of the disc drive. In particular, the lead wires are connected from the transducer elements to a flexible cable circuit. The flexible cable circuit is coupled to a central processor for retrieving data from discs of the disc drive.

Lead wires for each disc heads are connected to contacts via a soldering process. Each disc head has multiple lead wires for connecting transducer elements to the processing circuitry of the disc drive. Due to the size limitations of the disc drive, contacts for multiple lead wires are spaced in close proximity to one another. Thus, aligning and connecting specific lead wires to various contacts requires precision placement and soldering so that a good electrical connection is made between the respective lead wire and contact.

Soldering instruments include a soldering element having a soldering tip. During the soldering process, the soldering tip is heated so that an end of the soldering tip may melt solder to connect lead wires to contacts. During soldering, exposed portions of the soldering tip may improperly contact certain lead wires, thus interfering with the electrical connection of the wire to a particular contact or fusing the leads together. So, it is desirable to provide a soldering instrument which limits the interference of the soldering tip with other lead wires while soldering a particular lead wire to a contact. The present invention provides a solution to this and other problems, and offers advantages over the prior art.

SUMMARY OF THE INVENTION

The present invention relates to an improved soldering device including a heat shield coupled to a soldering tip for providing a protective barrier for the soldering tip. In particular, the heat shield is designed to have a lower temperature during operation and extends along an extent of the soldering tip to limit undesired contact of wires with the hot soldering tip.

In a preferred embodiment, the heat shield is integrally formed with the soldering tip. In particular, preferably, the heat shield includes elongated members extending in spaced alignment with the soldering tip having spaced extended ends. The spaced extended ends define an opened circuit so that the elongated members of the heat shield remain at a lower temperature for shielding the soldering tip.

DETAILED DESCRIPTION OF THE PREFERRED EMBODIMENTS

Figure 1:
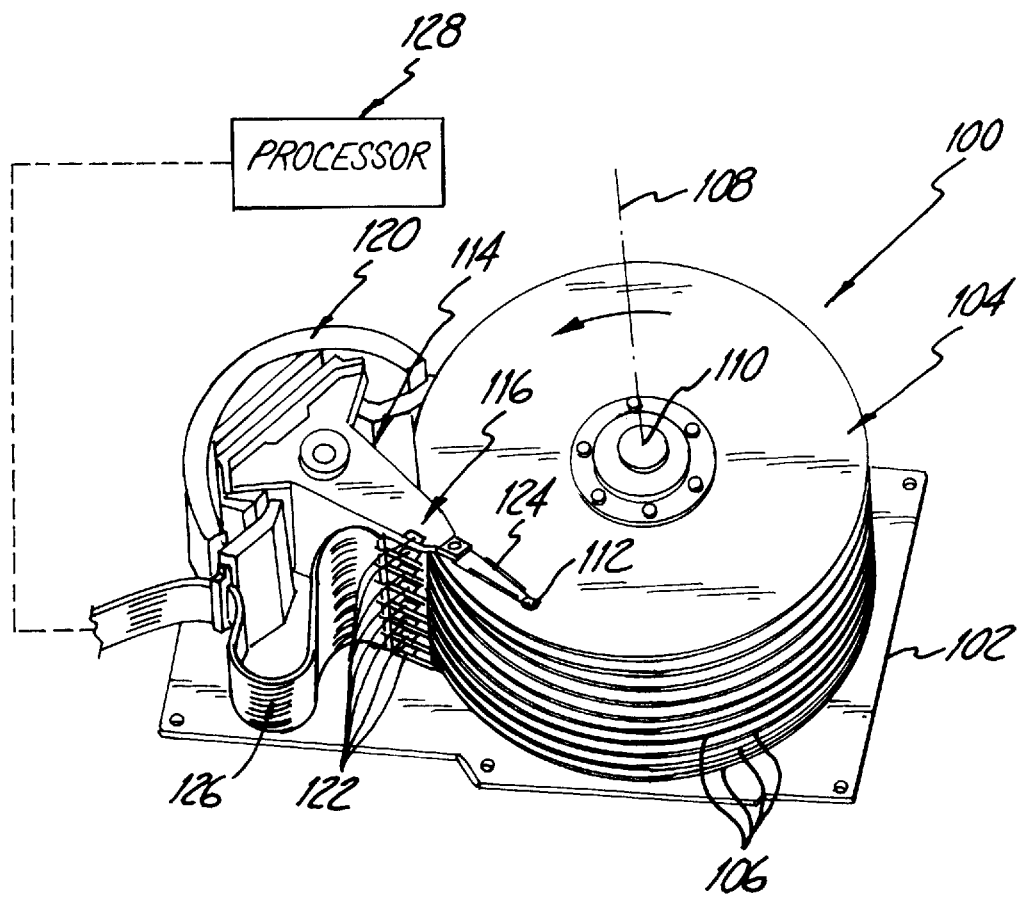
FIG. 1 is a perspective view illustrating components of a disc drive.

FIG. 1 is a perspective view of a disc drive 100, shown with the cover removed to illustrate the operational components of the disc drive. As shown, the disc drive 100 includes a base 102 which supports a disc stack 104 having a plurality of discs 106. Discs 106 are supported for rotation about a spindle axis 108 via a spindle motor (not shown). Disc stack 104 is coupled to the spindle motor via disc clamp 110. Disc heads 112 are movably supported via disc surfaces via an actuator mechanism 114. The actuator mechanism 114 includes an E-block 116 rotationally coupled to base 102. The E-block 116 is rotationally operated via a voice coil motor 120. The E-block 116 includes a plurality of spaced actuator arms 122. Disc heads 112 are operably coupled to spaced actuator arms 122 via suspension assemblies 124.

Lead wires (not shown) electrically connect transducer elements (not shown) on the disc heads 112 to a printed flex cable 126. Thus, read and write information from the transducers of the disc heads is electrically communicated to the flex cable 126 which is operably coupled to a central processing system 128 for operation of the disc drive. It should be understood that the present invention is not limited to use with a rotary actuated device and that the actuator mechanism may be a linear actuated device.

Figure 2:
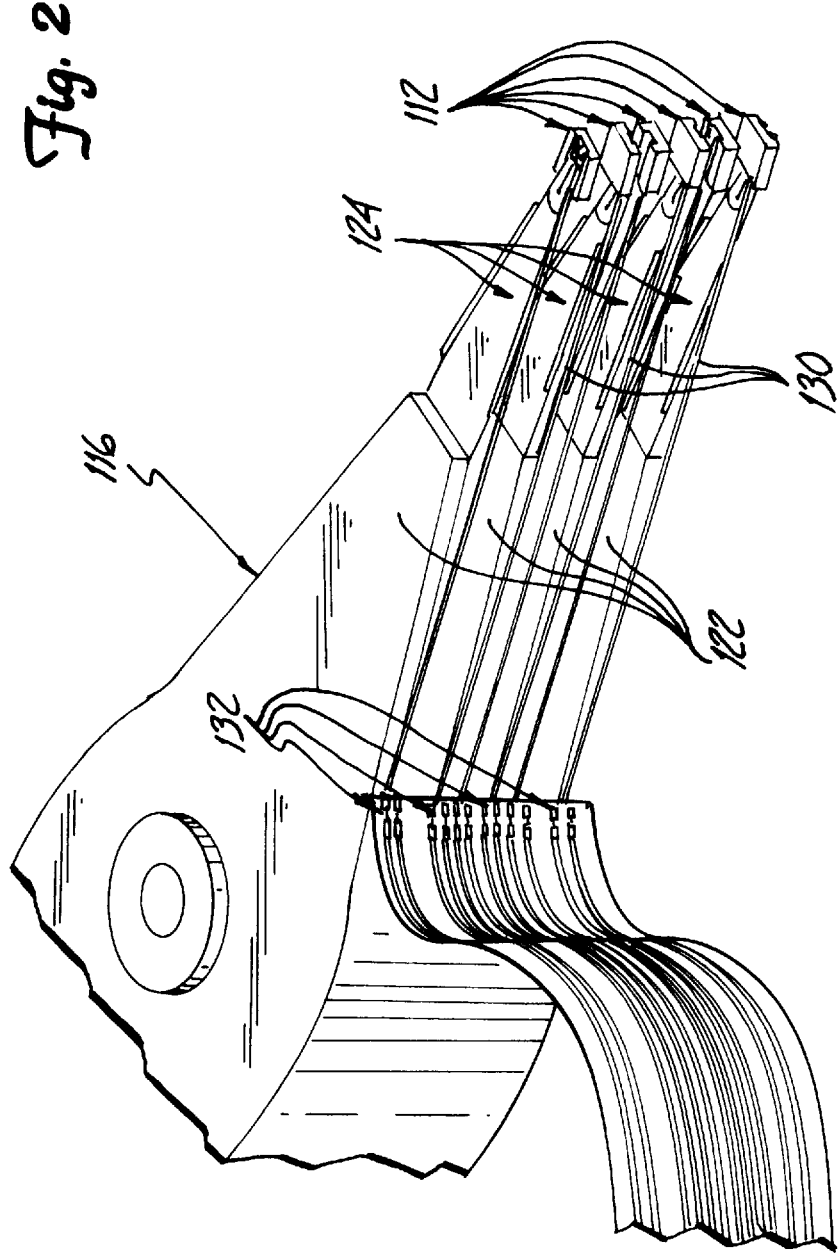
FIG. 2 is a perspective view of an actuation block movably supporting disc heads having lead wires coupled to a circuit.

FIG. 2 is an enlarged perspective view of the E-block 116 illustrating connection of lead wires 130 relative to flex cable 126. In particular, flexible cable 126 is coupled to E-block 116 and includes a plurality of lead contacts 132. Lead contacts 132 are individually coupled to separate conducting paths (not shown) for transmitting electrical signals from transducers. Due to the tight tolerances of the disc drive and the number of lead wires, contacts 132 for multiple lead wires are positioned in close proximity. Lead wires are typically soldered to contacts 132 to provide an electrical connection between the lead wires and conductive paths of the flexible circuit 126.

Figure 3:
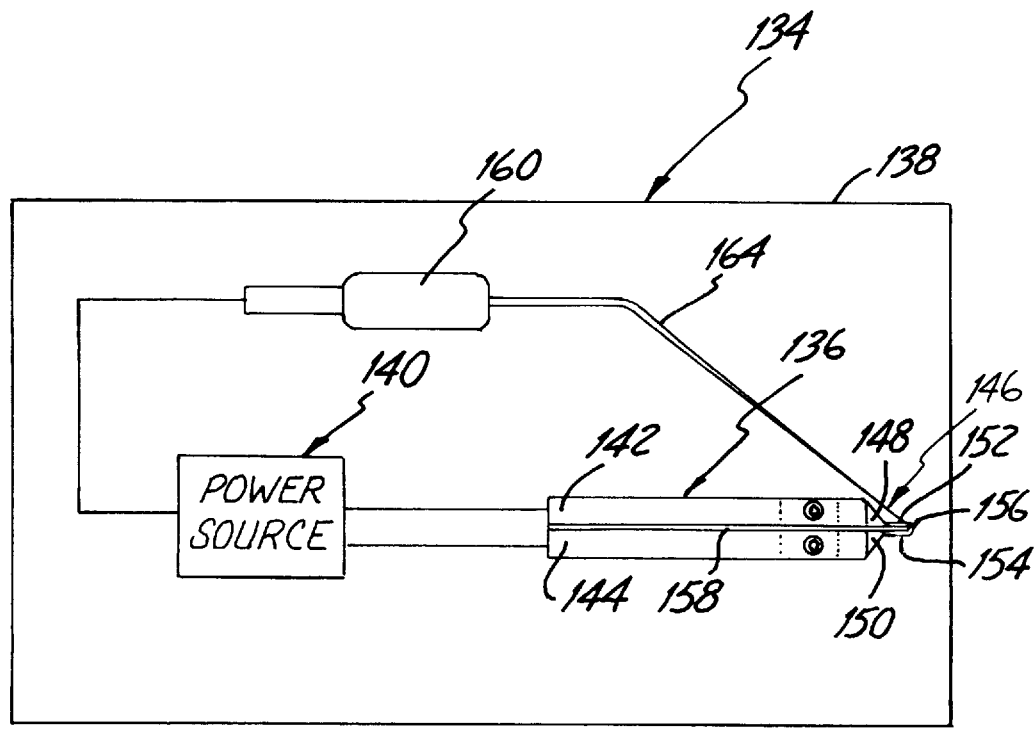
FIG. 3 is a schematic view illustrating a soldering instrument including a soldering element of the prior art.

FIG. 3 diagrammatically illustrates a soldering instrument 134 of the prior art. The soldering instrument 134 includes a soldering element 136 which is supported relative to a frame 138 (shown diagrammatically). The soldering element 136 is coupled to a power source 140 for heating the soldering element 136 for use. As shown in FIG. 3, an embodiment of a soldering element 136 includes spaced conductors 142, 144 coupled to a soldering member 146. The soldering member 146 includes spaced bases 148, 150, supporting spaced legs 152, 154 extending therefrom. Extended ends of legs 152, 154 are connected at end 156 to form a closed continuous electric circuit so that soldering member 146 defines a heating element or coil.

Conductors 142, 144 are coupled to power source 140. Bases 148, 150 of the heating coil are coupled to conductors 142, 144, respectively to supply a current through the heating coil. Conductors 142, 144 are formed of a relatively conductive material, such as copper, and the soldering member is preferably formed of a unitary element constructed of a steel material having sufficient resistivity to heat the soldering member for use. Preferably, spaced conductors 142, 144 are connected to form a composite structure including an insulating layer 158 therebetween.

Power source 140 supplies current through conductors 142, 144, so that current flows from conductor 142 through the heating coil to conductor 146. Legs 152, 154 and end 156 have a smaller area dimension than base portions 148, 150; and, thus, current flowing therethrough heats legs 152, 154 and end 156 to define a relatively hot soldering tip for soldering lead wires to contacts. Bases 148, 150 and legs 152, 154 are spaced a sufficient distance to prevent arcing between bases 148, 150 and legs 152, 154. Preferably, as shown, a thermocouple 160 is coupled to leg 152 or 154 via thermocouple lead 164. The thermocouple 160 measures the temperature of the soldering tip and provides feedback to the power source to regulate the current supplied and thereby regulates the soldering temperature of the soldering tip.

Figure 4:
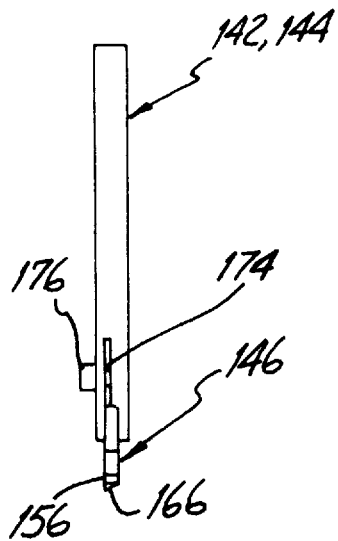
FIG. 4 is a side view of the soldering element shown in FIG. 3.

As shown in FIGS. 3–4, base portions 148, 150, legs 152, 154, and end 156 are preferably formed from a unitary planar member having a uniform thickness. End 156 supports a soldering contact 166 for application of heat to a soldering material. Bases 148, 150 are designed for connection to conductors 142, 144. In particular, the composite conductor structure includes an opened stepped slot 174 or other mounting mechanisms. The thickness of bases 148, 150 is sized for insertion into stepped slot 174 for removably securing the bases 148, 150 therein via connector 176 to connect bases 148, 150 to conductors 142, 144, respectively.

Figure 5:
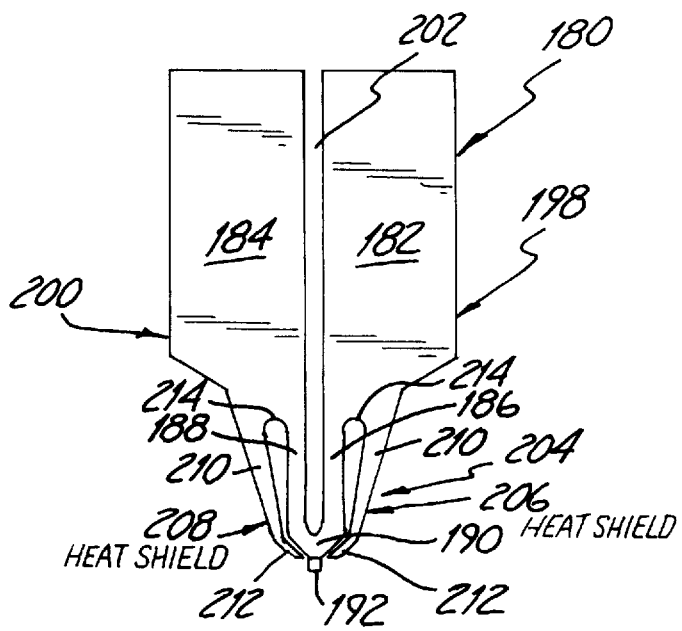
FIG. 5 is a front plan view of an embodiment of a soldering member of the present invention.
Figure 6:
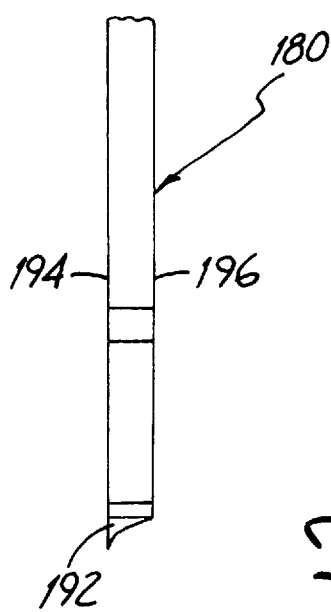
FIG. 6 is a side plan view of the soldering member of FIG. 5.

FIGS. 5–6 are front and side plan views of an embodiment of a soldering member 180 of the present invention. As shown, the soldering member is similar to the design of the soldering member illustrated in FIGS. 3–4 and includes spaced bases 182, 184, and spaced legs 186, 188 extending therefrom to converge at end 190. A soldering contact 192 extends from end 190. Preferably, the soldering member 180 is formed of a unitary planar structure having a uniform thickness as illustrated in FIG. 6. Thus, as described, the planar member defines faces 194, 196 (illustrated in FIG. 6) defined by the thickness of the unitary member and sides 198, 200.

The planar structure includes a wide portion that necks down to a narrow portion. A slot 202 extends through the wide portion to define bases 182, 184 and through narrow portion to define legs 186, 188, separated by a gap. As previously explained, the gap is sufficient to prevent arcing between bases 182, 184 and legs 186, 188. Thus, the bases 182, 184, legs 186, 188 and end 190 form a continuous circuit to define a heating coil through which current flows for soldering operations. Legs 186, 188 and end 190 have a smaller area dimension and thus lower resistivity whereby current flowing therethrough heats legs 186, 188 and end 190 to define the soldering tip for soldering lead wires to contacts.

As previously explained, contacts 132 are in close proximity. During operation, the soldering tip is aligned relative to a selected contact to solder a lead wire to the contact. Due to the space limitations and the number of lead wires located in close proximity, the soldering tip may improperly contact lead wires during a soldering operation. Since the soldering tip is relatively hot, contact of lead wires may interfere with the electrical connection of the lead wire to a designated contact thus, affecting the read and write data transmitted to the processor 128 from the transducer or may fuse lead wires together.

As shown in FIGS. 5–6, the soldering member 180 of the present invention includes a heat shield 204 which is preferably formed integrally with the heating circuit or element and extends in alignment with the soldering tip. Preferably, the heating shield 204 includes elongated members 206, 208, formed of a thermally conductive material, which extend from necked portions of bases 182, 184 in alignment with legs 186, 188 and end 190, and a spaced distance from legs 186, 188 to define gaps between legs 186, 188 and elongated members 206, 208. Extended ends of members 206, 208 are spaced to form an opened circuit to prevent current flow therethrough.

Elongated members are formed adjacent to the closed circuit defined by legs 186, 188 and end 190. Since legs 186, 188 are in electrical contact through end 190, forming a closed circuit, and members 206, 208 are spaced, forming an opened circuit, current flows through legs 186, 188 and end 190 to heat the soldering tip. Since the heat shield 204 is an opened circuit, current does not flow therethrough to heat the heat shield 204 and thus the heat shield 204 provides a protective barrier from the hot soldering tip. Additionally, the elongated members 206, 208 extend from larger dimensioned bases 182, 184 which define a heat sink to dissipate heat from the thermally conductive elongated members 206, 208.

Preferably, elongated members 206, 208 are integrally formed with the planar structure of base 182, 184, legs 186, 188 and end 190 and thus have a uniform thickness with legs 186, 188. In particular, preferably, elongated members 206, 208 and base 182, 184, legs 186, 188 and end 190 are formed of a unitary planar structure. The elongated members 206, 208 extend along opposed sides 198, 200 of the soldering tip. Preferably, as shown, members 206, 208 include first and second portions 210, 212. First portions 210 extend from bases 182, 184 along legs 186, 188 and are slightly tapered and sloped toward legs 186, 188 to define a tapered variable-dimension gap 214 between legs 186, 188 and members 206, 208 that narrows towards extended ends of legs 186, 188. Preferably, as shown, end 190 is "V" shaped. Second portions 212 extend from first portions 210 and are angled relative to the first portions 210 to extend in alignment and close proximity to converging "V-shaped" end 190. Preferably, the face 194, 196 of one of said legs 186, 188 includes a recessed portion (not shown) for attaching leads of a thermocouple or other temperature sensor (not shown in FIG. 5) for regulating the soldering temperature of the soldering instrument.

Members 206, 208 are positioned in close proximity to legs 186, 188 at extended ends thereof, and end 190 to define a low profile soldering element so that the protective barrier does not interfere with the close tolerance soldering process. As described, the heat shield provides a barrier for the soldering tip to limit undesired lead contact during soldering. In particular, preferably, as shown elongated members 206, 208 extend along opposed sides 198, 200 of soldering tip (and not faces 194, 196) to provide a relatively low profile soldering tip.

The soldering member of the present invention is not limited to the exact embodiment shown. For example, the soldering member may include a soldering tip which does not form a portion of the heating coil and may include a soldering tip which is not necessarily formed of a planar member or may be formed of a different material. Additionally, various designs of a heat shield may be used and the heat shield is not limited to the exact embodiment shown and described in the present application.

As described, the improved soldering device of the present invention includes a heat shield 204 fixedly coupled to a soldering tip. The heat shield is designed to have a lower temperature during operation to provide a protective barrier for the soldering tip. In a preferred embodiment, the heat shield 204 includes elongated members 206, 208 extending in spaced alignment with the soldering tip and integrally formed therewith. Extended ends of the elongated members 206, 208 are spaced to define an opened circuit so that the soldering tip is heated while the elongated members 206, 208 of the heat shield 204 remain at a lower temperature for shielding the soldering tip.

It should be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the design and structure of the heat shield may vary without departing from the scope and spirit of the present invention. In addition, although the preferred embodiment described herein is directed for use in assembly of a disc drive, it should be understood that the invention is not limited to the particular application described and may be used for other applications without departing from the spirit and scope of the present invention.

What is claimed is:

1. A device for connecting lead wires from a magnetic disc head to a cable comprising:
    a frame;
    a heating element operably coupled to the frame including first and second conductive bases;
    a soldering member having first and second ends and a continuous portion therebetween the first end being coupled to the first conductive base and the second end being coupled to the second conductive base, said first and second conductive bases being adapted to be coupled to a power source to supply a current through the soldering member; and
    a heat shield having shield members formed of a conductive material and conductively coupled to the first and second conductive bases in parallel with the soldering member so that current concurrently flows to one of the shield members and soldering member, the shield members extending in alignment with and spaced from the soldering member to provide a gap between the shield members and the soldering member, the shield members being spaced at extended ends thereof to provide a separated conductive path to limit current flow through shield members between the first and second conductive bases to provide a protective barrier from the soldering tip during a soldering operation.

2. The device of claim 1 wherein the soldering member and shield members are formed of generally planar members.

3. The device of claim 2 wherein the elongated members and soldering member are generally of a uniform thickness.

4. The device of claim 1 wherein the shield members and soldering member are formed of a unitary member.

5. The device of claim 1 wherein the heat shield is integrally formed with the soldering member.

6. The device of claim 1 wherein the heat shield is coupled to a heat sink to dissipate heat from the heat shield.

7. The device of claim 1 wherein the soldering member includes opposed spaced elongated legs which converge to a closed end to form the continuous portion between first and second ends and the shield members are elongated members which extend in spaced alignment with the legs of the soldering member.

8. The device of claim 7 wherein a portion of the elongated members of the heat shield are sloped towards the soldering member.

9. The device of claim 7 wherein the closed end is "V"-shaped.

10. The device of claim 9 wherein a portion of the elongated members of the heat shield are angled in alignment with the "V" shaped end.

11. The device of claim 7 wherein the closed end includes a soldering contact to define a soldering contact point for the device.

12. The device of claim 1 wherein a thermocouple is operably coupled to the soldering tip for gauging the temperature of the soldering element for regulating soldering temperature.

13. The device of claim 1 wherein the first and second conductive bases are integrally formed with the soldering member.

14. The device of claim 1 wherein the shield members extend along the length of the soldering member.

15. A soldering device adapted to be received in a soldering instrument comprising:
    a soldering member adapted to be heated for soldering operation the soldering member having first and second ends and a continuous portion therebetween the first and second ends being adapted to be coupled to a power source to supply current through the soldering member between the first and second ends; and
    a heat shield having shield members formed of a conductive material and conductively coupled to the first and second conductive bases in parallel with the soldering member so that current concurrently flows to one of the shield members and soldering member, the shield member extending therefrom in alignment with and spaced from the soldering member to provide an air gap between the shield members and the soldering member, the shield members being spaced at extended ends thereof to provide a separated conductive path to limit current flow through shield members between the first and second conductive bases to provide a protective barrier from the soldering tip during a soldering operation.

16. The soldering instrument of claim 15 wherein the heat shield and soldering member are formed of a unitary member.

17. The device of claim 15 wherein the shield members are coupled to a heat sink to dissipate heat from the heat shield.

18. The device of claim 15 wherein the soldering member includes opposed spaced elongated legs which converge to a closed end to form the continuous portion between first and second ends and the shield members are elongated members which extend in spaced alignment with the legs of the soldering member.

19. A soldering instrument comprising:

a frame;

a heating element operably coupled to the frame including:

first and second conductive bases;

a soldering member having first and second ends and a continuous portion therebetween, the first end being coupled to the first end and the second end being coupled to the second end, said first and second conductive bases being adapted to supply a current through the soldering member between the first end and second end to define a continuous heating circuit; and a heat shield having shield members formed of a conductive material and conductively coupled to the first and second conductive bases in parallel with the soldering member so that current concurrently flows to one of the shield members and soldering member and extending therefrom in alignment with and spaced from the soldering member to provide a gap between the shield members and the soldering member, the shield members being spaced at extended ends thereof to provide a separated conductive path to limit current flow through shield members between the first and second conductive bases to provide a protective barrier from the soldering tip during a soldering operation.

\* \* \* \* \*